United States Patent
Viscarola et al.

(10) Patent No.: US 11,301,548 B2
(45) Date of Patent: Apr. 12, 2022

(54) APPARATUS AND METHOD FOR PREVENTING UNINTENDED OR UNAUTHORIZED PERIPHERAL DEVICE CONNECTIVITY BY REQUIRING AUTHORIZED HUMAN RESPONSE

(71) Applicants: Honeywell International Inc., Morris Plains, NJ (US); OSR Open Systems Resources, Inc., Amherst, NH (US)

(72) Inventors: Peter G. Viscarola, Mont Vernon, NH (US); Scott J. Noone, Amherst, NH (US); Eric D. Knapp, Milton, NH (US); Christopher W. Barr, Nashua, NH (US); David Young, Stratham, NH (US); Kevin McMurdie, Surprise, AZ (US); Ganesh P. Gadhe, Phoenix, AZ (US)

(73) Assignee: Honeywell International Inc., Charlotte, NC (US)

( * ) Notice: Subject to any disclaimer, the term of this patent is extended or adjusted under 35 U.S.C. 154(b) by 538 days.

(21) Appl. No.: 15/928,577

(22) Filed: Mar. 22, 2018

(65) Prior Publication Data

US 2018/0365397 A1   Dec. 20, 2018

Related U.S. Application Data

(60) Provisional application No. 62/521,144, filed on Jun. 16, 2017.

(51) Int. Cl.
  *G06F 21/44*   (2013.01)
  *G06F 21/31*   (2013.01)
  (Continued)

(52) U.S. Cl.
  CPC .............. *G06F 21/31* (2013.01); *G06F 21/44* (2013.01); *G06F 21/45* (2013.01); *G06F 21/6209* (2013.01)

(58) Field of Classification Search
  CPC .......... G06F 21/30; G06F 21/31; G06F 21/44; G06F 21/445; G06F 21/45; G06F 21/57;
  (Continued)

(56) References Cited

U.S. PATENT DOCUMENTS

2008/0086694 A1\* 4/2008 Mann ...................... G06F 9/454
                                                                715/744
2013/0014221 A1\* 1/2013 Moore .................... G06F 21/85
                                                                726/3

(Continued)

OTHER PUBLICATIONS

"Device nodes and device stacks", https://docs.microsoft.com/en-us/windows-hardware/drivers/gettingstarted/device-nodes-and-device-stacks, Apr. 20, 2017, 10 pages.

*Primary Examiner* — Theodore C Parsons
(74) *Attorney, Agent, or Firm* — Seager, Tufte & Wickhem, LLP

(57) ABSTRACT

A method includes detecting a connection attempt from a device, quarantining the device to prevent the device from substantially interacting with a host system, and determining whether the device requires verification while the device is quarantined. The method also includes, in response to determining that the device requires verification, presenting at least one authorization challenge to a user while the device is quarantined. The at least one authorization challenge requests that the user provide at least one specified response. The method further includes, in response to determining that the device requires verification, determining whether the user correctly provided the at least one specified response while the device is quarantined, granting access to the device
(Continued)

in response to determining that the user correctly provided the at least one specified response, and continuing to quarantine the device in response to determining that the user did not correctly provide the at least one specified response.

20 Claims, 7 Drawing Sheets

(51) Int. Cl.
  *G06F 21/45* (2013.01)
  *G06F 21/62* (2013.01)
(58) Field of Classification Search
  CPC ........ G06F 21/575; G06F 21/60; G06F 21/62; G06F 21/6209; G06F 21/70; G06F 21/71; G06F 21/82; G06F 21/85; H04L 63/08; H04L 63/083; H04L 63/0838; H04L 63/0876; H04L 63/10
  See application file for complete search history.

(56) References Cited

U.S. PATENT DOCUMENTS

| | | | |
|---|---|---|---|
| 2014/0064482 A1* | 3/2014 | Sin | H04L 9/0891 380/44 |
| 2015/0365237 A1* | 12/2015 | Soffer | G06F 21/85 726/20 |
| 2016/0299865 A1* | 10/2016 | Hetzler | G06F 21/567 |
| 2016/0328579 A1* | 11/2016 | Jois | G06F 21/85 |
| 2017/0339189 A1* | 11/2017 | Leong | H04W 12/003 |
| 2017/0351854 A1 | 12/2017 | Knapp et al. | |
| 2017/0351858 A1 | 12/2017 | Knapp et al. | |
| 2017/0351870 A1 | 12/2017 | Knapp et al. | |
| 2017/0351877 A1 | 12/2017 | Knapp et al. | |
| 2017/0353460 A1 | 12/2017 | Knapp et al. | |
| 2017/0353461 A1 | 12/2017 | Knapp et al. | |
| 2017/0353484 A1 | 12/2017 | Knapp et al. | |
| 2018/0165429 A1* | 6/2018 | Leong | G06F 3/0346 |

* cited by examiner

US 11,301,548 B2

APPARATUS AND METHOD FOR PREVENTING UNINTENDED OR UNAUTHORIZED PERIPHERAL DEVICE CONNECTIVITY BY REQUIRING AUTHORIZED HUMAN RESPONSE

CROSS-REFERENCE TO RELATED APPLICATION AND PRIORITY CLAIM

This application claims priority under 35 U.S.C. § 119(e) to U.S. Provisional Patent Application No. 62/521,144 filed on Jun. 16, 2017. This provisional patent application is hereby incorporated by reference in its entirety.

TECHNICAL FIELD

This disclosure relates generally to security technology. More specifically, this disclosure relates to an apparatus and method for preventing unintended or unauthorized peripheral device connectivity by requiring an authorized human response.

BACKGROUND

Many systems are designed to accommodate modular components ("devices") that may be attached to and used by a host system, often using a standardized connection that supports third-party devices. In some instances, allowing certain devices to connect to a host system may be undesirable. For example, certain devices might represent a physical threat or a digital threat (a "cyberthreat") to safe and reliable operation of the host system. This is especially true in protected environments such as industrial control systems, manufacturing plants, critical manufacturing facilities, health care facilities/hospitals, and classified network areas. These protected environments can rely heavily upon the use of mechanical devices like sensors, actuators, motors, or similar devices. These protected environments can also rely heavily upon the use of digital devices like removable media, such as Universal Serial Bus (USB) drives.

Dependence upon device connectivity has introduced a new threat vector for physical attacks and cyberattacks into protected systems. For example, peripheral devices may be modified or infected with malware within a supply chain, introducing a threat to protected systems when these devices are introduced into the protected systems. As specific examples, mechanical devices may have altered parameters or specifications intended to cause a failure. Devices with embedded firmware may have modified firmware that is designed to produce aberrant or unexpected behavior. Computing devices may be infected with malicious code. USB storage media may be subject to any or all of the above risks. Commercially-available tools exist today that can physically modify USB devices through the manipulation of electrical currents, causing the USB devices to spoof other USB device types in order to execute cyberattacks or transfer digital files that contain malware (such as through a direct file transfer or spoofing a Human Interface Device like a keyboard and literally typing the malicious code directly).

Because of the prevalence and ubiquity of USB devices, USB represents one of the primary inbound vectors through which viruses and other malware can enter secure facilities. Unfortunately, these types of attacks are becoming more and more sophisticated. The firmware of many USB devices is vulnerable to exploitation, allowing the creation of malicious or "infected" USB devices that are extremely difficult to detect. While many of these attacks are currently specific to USB devices, it is inevitable that similar attacks will be developed for other devices that use standard interfaces, connectors, or protocols.

SUMMARY

This disclosure provides an apparatus and method for preventing unintended or unauthorized peripheral device connectivity by requiring an authorized human response.

In a first embodiment, a method includes detecting a connection attempt from a device, quarantining the device to prevent the device from substantially interacting with a host system, and determining whether the device requires verification while the device is quarantined. The method also includes, in response to determining that the device requires verification, presenting at least one authorization challenge to a user while the device is quarantined, where the at least one authorization challenge requests that the user provide at least one specified response. The method further includes, in response to determining that the device requires verification, determining whether the user correctly provided the at least one specified response while the device is quarantined, granting access to the device in response to determining that the user correctly provided the at least one specified response, and continuing to quarantine the device in response to determining that the user did not correctly provide the at least one specified response.

In a second embodiment, an apparatus includes at least one processor configured to detect a connection attempt from a device, quarantine the device to prevent the device from substantially interacting with a host system comprising the apparatus, and determine whether the device requires verification while the device is quarantined. The at least one processor is also configured, in response to determining that the device requires verification, to present at least one authorization challenge to a user while the device is quarantined, where the at least one authorization challenge requests that the user provide at least one specified response. The at least one processor is further configured, in response to determining that the device requires verification, to determine whether the user correctly provided the at least one specified response while the device is quarantined. In addition, the at least one processor is also configured, in response to determining that the device requires verification, to grant access to the device in response to determining that the user correctly provided the at least one specified response and continue to quarantine the device in response to determining that the user did not correctly provide the at least one specified response.

In a third embodiment, a non-transitory computer readable medium contains instructions that when executed cause at least one processing device to detect a connection attempt from a device, quarantine the device to prevent the device from substantially interacting with a host system, and determine whether the device requires verification while the device is quarantined. The medium also contains instructions that when executed cause the at least one processing device, in response to determining that the device requires verification, to present at least one authorization challenge to a user while the device is quarantined, where the at least one authorization challenge requests that the user provide at least one specified response. The medium further contains instructions that when executed cause the at least one processing device, in response to determining that the device requires verification, to determine whether the user correctly provided the at least one specified response while the device is quarantined. In addition, the medium contains instructions that when executed cause the at least one processing device, in response to determining that the device requires verification, to grant access to the device in response to determining that the user correctly provided the at least one specified response and continue to quarantine the device in response to determining that the user did not correctly provide the at least one specified response.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
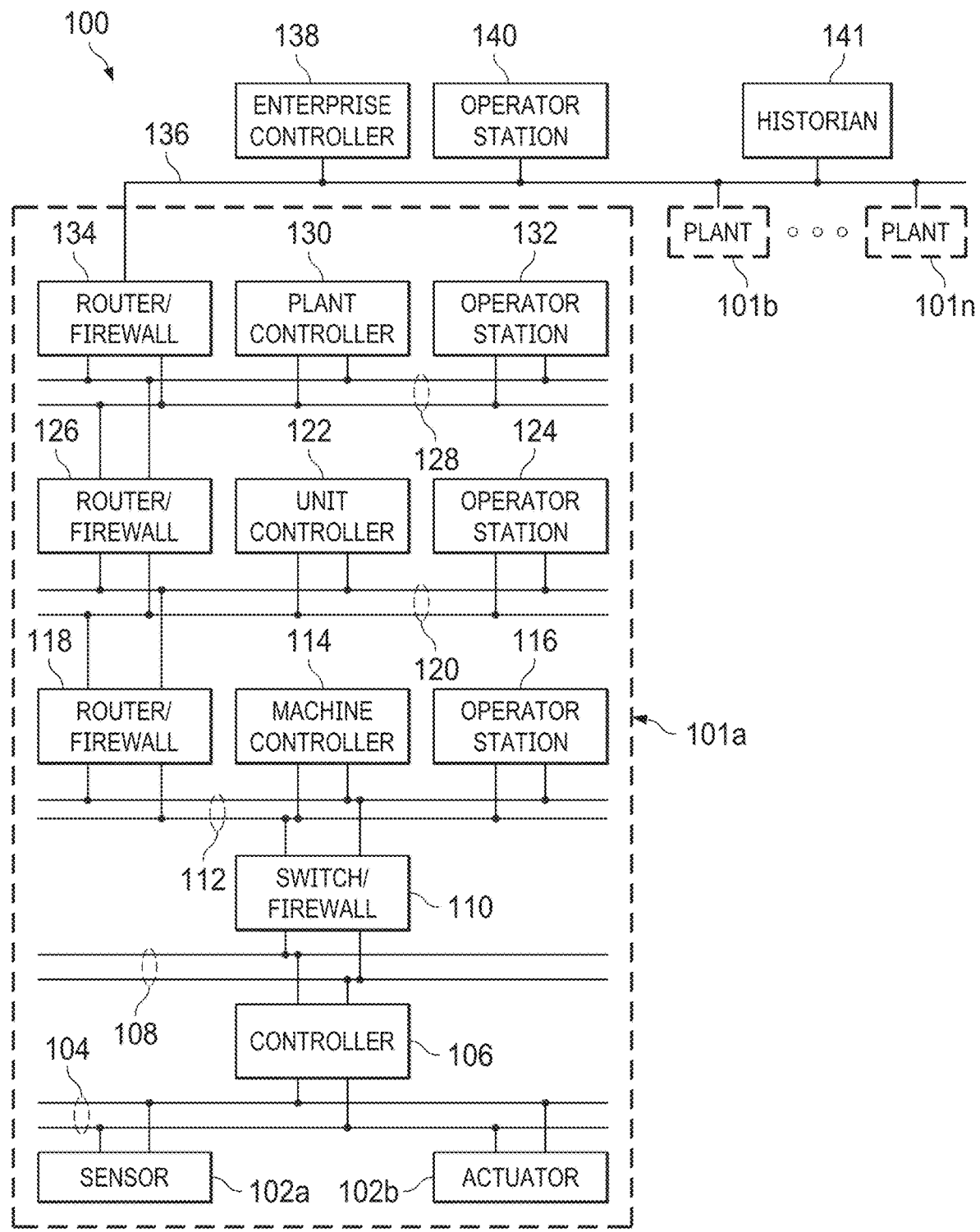
FIG. 1 illustrates an example industrial process control and automation system according to this disclosure.

FIGS. 1 through 7, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

As noted above, there are various ways in which devices can be modified or otherwise configured to allow or support physical attacks or cyberattacks into protected systems. For example, a Universal Serial Bus (USB) device could be configured to appear as or "spoof" another device type, and a protected system could grant access to the USB device based on the spoofed device type. The USB device could then change its device type and be used to launch a cyberattack in the protected system. These types of attacks are becoming more and more sophisticated and are extremely difficult to detect.

This disclosure provides techniques for preventing unintended or unauthorized peripheral device connectivity by requiring an authorized human response. When a peripheral device (such as a USB device, sensor, actuator, or motor) is connected to a host system, the peripheral device is initially quarantined, thereby preventing programmatic or automated use of the peripheral device. This helps to protect against unintended or malicious use the peripheral device. Before the quarantined peripheral device can be used, an explicit response from an authorized human user needs to be obtained. Receiving an explicit (and expected) human response from an authorized user allows the quarantined peripheral device to successfully connect to the host system. This helps to ensure that a conscious decision to allow or disallow the device connection is made by the user.

Note that these approaches can be used for any suitable devices, including USB devices. These approaches are uniquely capable of helping to prevent complex threats posed by rogue USB devices or other devices and by USB devices or other devices corrupted by malware-infected firmware. These approaches can also be used to protect against supply-chain attacks or other attacks where malicious or modified devices attempt to gain access to a host system through other mechanisms. Examples of other mechanisms can include Peripheral Component Interconnect (PCI) buses, mechanical interconnects or relays, and automation input/output (I/O) interfaces.

Because these approaches require that a human action (and optionally a human action by a specific user or type of user) be performed before a device is allowed to connect, this interrupts normal device connectivity and allows various benefits or advantages to be obtained. For example, a USB or other bus defense can be provided that requires a human action to connect devices, preventing programmatic or automated access. Also, by optionally limiting an authorization challenge/response to authorized privileged users, this can reduce or eliminate the potential for a rogue actor to purposefully introduce malicious USB devices or other devices. Further, a device may not be able to connect to a host system without a human having explicit knowledge of the connection and the device type(s) being connected, which helps to reduce or eliminate the ability for a rogue device to announce itself to a USB host controller or other controller as another device class. In addition, a device could not change its behavior by announcing a new device class/classes or other parameters programmatically. This can reduce or eliminate the ability for a rogue device to connect as one device type and then change its device type(s) after connection to perform an undesired activity (such as by connecting as a human interface device or "HID" to type commands). Specialized mechanisms can be used to perform user input in order to support cases where a USB device or other device being challenged is the same device providing the user input (such as a keyboard or mouse).

FIG. 1 illustrates an example industrial process control and automation system 100 according to this disclosure. As shown in FIG. 1, the system 100 includes various components that facilitate production or processing of at least one product or other material. For instance, the system 100 is used here to facilitate control over components in one or multiple plants 101a-101n. Each plant 101a-101n represents one or more processing facilities (or one or more portions thereof), such as one or more manufacturing facilities for producing at least one product or other material. In general, each plant 101a-101n may implement one or more processes and can individually or collectively be referred to as a process system. A process system generally represents any system or portion thereof configured to process one or more products or other materials in some manner.

In FIG. 1, the system 100 is implemented using the Purdue model of process control. In the Purdue model, "Level 0" may include one or more sensors 102a and one or more actuators 102b. The sensors 102a and actuators 102b represent components in a process system that may perform any of a wide variety of functions. For example, the sensors 102a could measure a wide variety of characteristics in the process system, such as temperature, pressure, or flow rate. Also, the actuators 102b could alter a wide variety of characteristics in the process system. The sensors 102a and actuators 102b could represent any other or additional components in any suitable process system. Each of the sensors 102a includes any suitable structure for measuring one or more characteristics in a process system. Each of the actuators 102b includes any suitable structure for operating on or affecting one or more conditions in a process system.

One or more networks 104 are coupled to the sensors 102a and actuators 102b. The network 104 facilitates interaction with the sensors 102a and actuators 102b. For example, the network 104 could transport measurement data from the sensors 102a and provide control signals to the actuators 102b. The network 104 could represent any suitable network or combination of networks. As particular examples, the network 104 could represent an Ethernet network, an electrical signal network (such as a HART network), a pneumatic control signal network, or any other or additional type(s) of network(s).

In the Purdue model, "Level 1" includes one or more controllers 106, which are coupled to the network 104. Among other things, each controller 106 may use the measurements from one or more sensors 102a to control the operation of one or more actuators 102b. Each controller 106 includes any suitable structure for controlling one or more aspects of a process system. As a particular example, each controller 106 could represent a computing device running a real-time operating system, a MICROSOFT WINDOWS operating system, or other operating system.

Redundant networks 108 are coupled to the controllers 106. The networks 108 facilitate interaction with the controllers 106, such as by transporting data to and from the controllers 106. The networks 108 could represent any suitable redundant networks. As particular examples, the networks 108 could represent a pair of Ethernet networks or a redundant pair of Ethernet networks, such as a FAULT TOLERANT ETHERNET (FTE) network from HONEYWELL INTERNATIONAL INC.

At least one switch/firewall 110 couples the networks 108 to two networks 112. The switch/firewall 110 may transport traffic from one network to another network. The switch/firewall 110 may also block traffic on one network from reaching another network. The switch/firewall 110 includes any suitable structure for providing communication between networks, such as a HONEYWELL CONTROL FIREWALL (CF9) device. The networks 112 could represent any suitable networks, such as a pair of Ethernet networks or an FTE network.

In the Purdue model, "Level 2" may include one or more machine-level controllers 114 coupled to the networks 112. The machine-level controllers 114 perform various functions to support the operation and control of the controllers 106, sensors 102a, and actuators 102b, which could be associated with a particular piece of industrial equipment (such as a boiler or other machine). For example, the machine-level controllers 114 could log information collected or generated by the controllers 106, such as measurement data from the sensors 102a or control signals for the actuators 102b. The machine-level controllers 114 could also execute applications that control the operation of the controllers 106, thereby controlling the operation of the actuators 102b. In addition, the machine-level controllers 114 could provide secure access to the controllers 106. Each of the machine-level controllers 114 includes any suitable structure for providing access to, control of, or operations related to a machine or other individual piece of equipment. Each of the machine-level controllers 114 could, for example, represent a server computing device running a MICROSOFT WINDOWS operating system or other operating system. Although not shown, different machine-level controllers 114 could be used to control different pieces of equipment in a process system (where each piece of equipment is associated with one or more controllers 106, sensors 102a, and actuators 102b).

One or more operator stations 116 are coupled to the networks 112. The operator stations 116 represent computing or communication devices providing user access to the machine-level controllers 114, which could then provide user access to the controllers 106 (and possibly the sensors 102a and actuators 102b). As particular examples, the operator stations 116 could allow users to review the operational history of the sensors 102a and actuators 102b using information collected by the controllers 106 and/or the machine-level controllers 114. The operator stations 116 could also allow the users to adjust the operation of the sensors 102a, actuators 102b, controllers 106, or machine-level controllers 114. In addition, the operator stations 116 could receive and display warnings, alerts, or other messages or displays generated by the controllers 106 or the machine-level controllers 114. Each of the operator stations 116 includes any suitable structure for supporting user access and control of one or more components in the system 100. Each of the operator stations 116 could, for example, represent a computing device running a MICROSOFT WINDOWS operating system or other operating system.

At least one router/firewall 118 couples the networks 112 to two networks 120. The router/firewall 118 includes any suitable structure for providing communication between networks, such as a secure router or combination router/firewall. The networks 120 could represent any suitable networks, such as a pair of Ethernet networks or an FTE network.

In the Purdue model, "Level 3" may include one or more unit-level controllers 122 coupled to the networks 120. Each unit-level controller 122 is typically associated with a unit in a process system, which represents a collection of different machines operating together to implement at least part of a process. The unit-level controllers 122 perform various functions to support the operation and control of components in the lower levels. For example, the unit-level controllers 122 could log information collected or generated by the components in the lower levels, execute applications that control the components in the lower levels, and provide secure access to the components in the lower levels. Each of the unit-level controllers 122 includes any suitable structure for providing access to, control of, or operations related to one or more machines or other pieces of equipment in a process unit. Each of the unit-level controllers 122 could, for example, represent a server computing device running a MICROSOFT WINDOWS operating system or other operating system. Although not shown, different unit-level controllers 122 could be used to control different units in a process system (where each unit is associated with one or more machine-level controllers 114, controllers 106, sensors 102a, and actuators 102b).

Access to the unit-level controllers 122 may be provided by one or more operator stations 124. Each of the operator stations 124 includes any suitable structure for supporting user access and control of one or more components in the system 100. Each of the operator stations 124 could, for example, represent a computing device running a MICROSOFT WINDOWS operating system or other operating system.

At least one router/firewall 126 couples the networks 120 to two networks 128. The router/firewall 126 includes any suitable structure for providing communication between networks, such as a secure router or combination router/firewall. The networks 128 could represent any suitable networks, such as a pair of Ethernet networks or an FTE network.

In the Purdue model, "Level 4" may include one or more plant-level controllers 130 coupled to the networks 128. Each plant-level controller 130 is typically associated with one of the plants 101a-101n, which may include one or more process units that implement the same, similar, or different processes. The plant-level controllers 130 perform various functions to support the operation and control of components in the lower levels. As particular examples, the plant-level controller 130 could execute one or more manufacturing execution system (MES) applications, scheduling applications, or other or additional plant or process control applications. Each of the plant-level controllers 130 includes any suitable structure for providing access to, control of, or operations related to one or more process units in a process plant. Each of the plant-level controllers 130 could, for example, represent a server computing device running a MICROSOFT WINDOWS operating system or other operating system.

Access to the plant-level controllers 130 may be provided by one or more operator stations 132. Each of the operator stations 132 includes any suitable structure for supporting user access and control of one or more components in the system 100. Each of the operator stations 132 could, for example, represent a computing device running a MICROSOFT WINDOWS operating system or other operating system.

At least one router/firewall 134 couples the networks 128 to one or more networks 136. The router/firewall 134 includes any suitable structure for providing communication between networks, such as a secure router or combination router/firewall. The network 136 could represent any suitable network, such as an enterprise-wide Ethernet or other network or all or a portion of a larger network (such as the Internet).

In the Purdue model, "Level 5" may include one or more enterprise-level controllers 138 coupled to the network 136. Each enterprise-level controller 138 is typically able to perform planning operations for multiple plants 101a-101n and to control various aspects of the plants 101a-101n. The enterprise-level controllers 138 can also perform various functions to support the operation and control of components in the plants 101a-101n. As particular examples, the enterprise-level controller 138 could execute one or more order processing applications, enterprise resource planning (ERP) applications, advanced planning and scheduling (APS) applications, or any other or additional enterprise control applications. Each of the enterprise-level controllers 138 includes any suitable structure for providing access to, control of, or operations related to the control of one or more plants. Each of the enterprise-level controllers 138 could, for example, represent a server computing device running a MICROSOFT WINDOWS operating system or other operating system. In this document, the term "enterprise" refers to an organization having one or more plants or other processing facilities to be managed. Note that if a single plant 101a is to be managed, the functionality of the enterprise-level controller 138 could be incorporated into the plant-level controller 130.

Access to the enterprise-level controllers 138 may be provided by one or more operator stations 140. Each of the operator stations 140 includes any suitable structure for supporting user access and control of one or more components in the system 100. Each of the operator stations 140 could, for example, represent a computing device running a MICROSOFT WINDOWS operating system or other operating system.

A historian 142 is also coupled to the network 136 in this example. The historian 142 could represent a component that stores various information about the system 100. The historian 142 could, for example, store information used during production scheduling and optimization. The historian 142 represents any suitable structure for storing and facilitating retrieval of information. Although shown as a single centralized component coupled to the network 136, the historian 142 could be located elsewhere in the system 100, or multiple historians could be distributed in different locations in the system 100.

In some embodiments, various components in the system 100 can support a mechanism that obtains an authorized human response before allowing peripheral device connectivity, which can help to reduce or prevent unintended or unauthorized use of the peripheral device. For example, a controller could require an authorized human response before interacting with a sensor or an actuator, or an operator station could require an authorized human response before interacting with a USB device. The authorized human response can take various forms, such as those described below. Whatever the form, the authorized human response represents an explicit human approval of the peripheral device, and connectivity to the peripheral device by a host system can be restricted or blocked until an authorized human response is obtained. Once an authorized human response is obtained, access to the peripheral device by the host system is allowed. However, the peripheral device can still be monitored to detect and prevent certain operations from occurring, such as the peripheral device attempting to change its device type and perform unintended or unauthorized operations after access is granted.

Although FIG. 1 illustrates one example of an industrial process control and automation system 100, various changes may be made to FIG. 1. For example, industrial control and automation systems come in a wide variety of configurations. The system 100 shown in FIG. 1 is meant to illustrate one example operational environment in which techniques for preventing unintended or unauthorized peripheral device connectivity by requiring an authorized human response could be used. However, FIG. 1 does not limit this disclosure to any particular configuration or operational environment. The techniques for preventing unintended or unauthorized peripheral device connectivity by requiring an authorized human response could be used in any other suitable system, and that system need not relate to industrial process control or automation.

Figure 2:
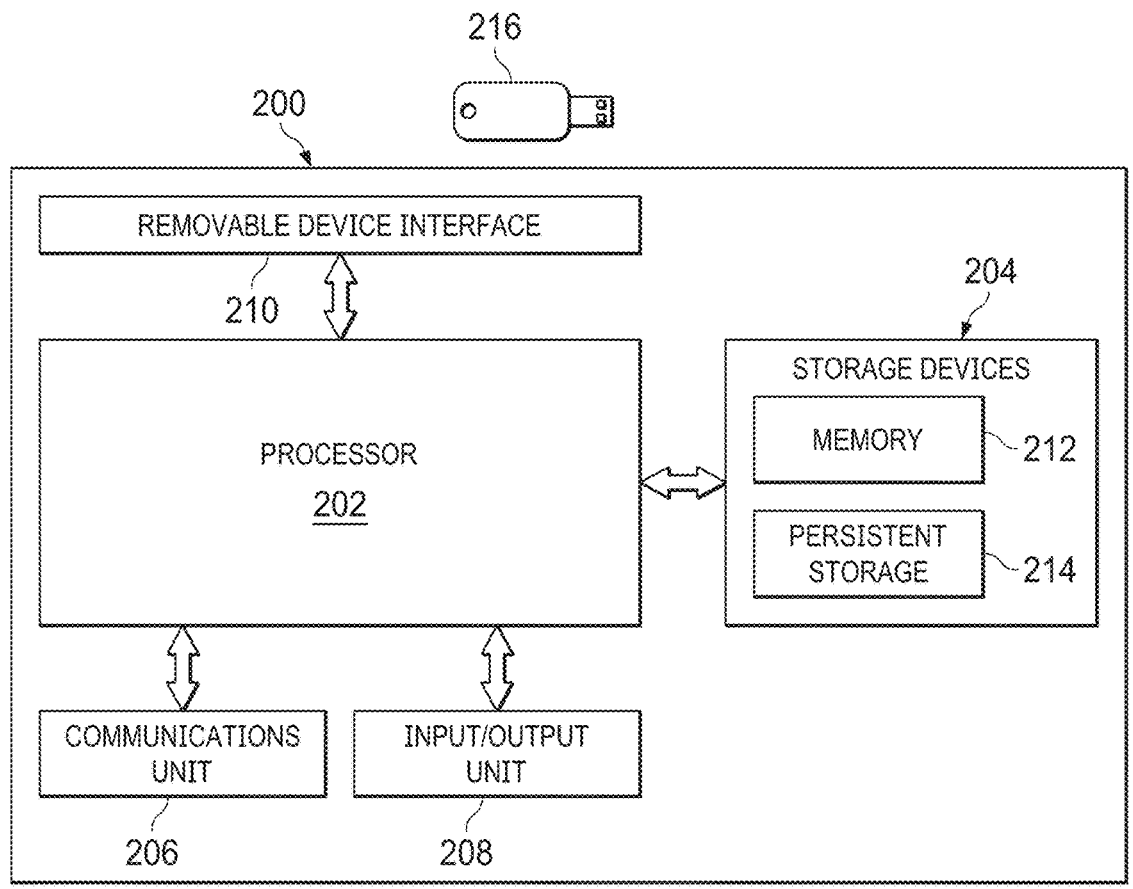
FIG. 2 illustrates an example device for preventing unintended or unauthorized peripheral device connectivity by requiring an authorized human response according to this disclosure.

FIG. 2 illustrates an example device 200 for preventing unintended or unauthorized peripheral device connectivity by requiring an authorized human response according to this disclosure. For example, the device 200 shown in FIG. 2 could denote any of the controllers, operator stations, or other devices in the system 100 of FIG. 1. The device 200 shown in FIG. 2 could also denote any device that is to be protected using the techniques described in this patent document, such as any suitable computing or other data processing device (including those not related to industrial process control or automation).

As shown in FIG. 2, the device 200 includes at least one processor 202, at least one storage device 204, at least one communications unit 206, at least one input/output (I/O) unit 208, and at least one removable device interface 210. Each processor 202 can execute instructions, such as those that may be loaded into a memory 212. The instructions could, for example, implement techniques for preventing unintended or unauthorized peripheral device connectivity by requiring an authorized human response. Each processor 202 denotes any suitable processing device, such as one or more microprocessors, microcontrollers, digital signal processors, application specific integrated circuits (ASICs), field programmable gate arrays (FPGAs), or discrete circuitry.

The memory 212 and a persistent storage 214 are examples of storage devices 204, which represent any structure(s) capable of storing and facilitating retrieval of information (such as data, program code, and/or other suitable information on a temporary or permanent basis). The memory 212 may represent a random access memory or any other suitable volatile or non-volatile storage device(s). The persistent storage 214 may contain one or more components or devices supporting longer-term storage of data, such as a read only memory, hard drive, Flash memory, or optical disc.

The communications unit 206 supports communications with other systems or devices. For example, the communications unit 206 could include a network interface card or a wireless transceiver facilitating communications over a wired or wireless network. The communications unit 206 may support communications through any suitable physical or wireless communication link(s).

The I/O unit 208 allows for input and output of data. For example, the I/O unit 208 may provide a connection for user input through a keyboard, mouse, keypad, touchscreen, or other suitable input device. The I/O unit 208 may also send output to a display, printer, or other suitable output device.

Each removable device interface 210 denotes a structure to which at least one peripheral device 216 can be coupled. For example, the device 200 could include one or more USB slots, FIREWIRE ports, THUNDERBOLT ports, or other interfaces for coupling to peripheral devices 216. Depending on the implementation, the device 200 could include a single removable device interface 210 or multiple removable device interfaces 210 of the same type or of different types.

Each peripheral device 216 denotes any suitable device that can be communicatively coupled to or interact with the processor 202 or other components of the device 200 and through which a physical attack or cyberattack could be initiated or supported. In this example, the peripheral device 216 represents a USB device, such as a USB Flash drive. However, any other type or types of peripheral devices could be used here, such as other types of USB devices (like keyboards, mice, trackpads, or network adapters), PCI devices, Secure Digital (SD) cards, serially-connected devices, mechanical devices, or industrial process control or automation devices.

As described in more detail below, when a peripheral device 216 is coupled to a removable device interface 210 or is otherwise coupled to a device 200, the processor 202 or other suitable component of the device 200 could quarantine the peripheral device 216 and issue a challenge to a user. Until an authorized human response is obtained, the peripheral device 216 can remain quarantined. Once an authorized human response is obtained and confirmed, access to the peripheral device 216 can be granted, which allows the peripheral device 216 to be used with the device 200. Additional operations can then occur to, for example, prevent the peripheral device 216 from attempting to change its device type and perform unintended or unauthorized operations.

Although FIG. 2 illustrates one example of a device 200 for preventing unintended or unauthorized peripheral device connectivity by requiring an authorized human response, various changes may be made to FIG. 2. For example, various components in FIG. 2 could be combined, further subdivided, or omitted and additional components could be added according to particular needs. Also, computing devices can come in a wide variety of configurations, and FIG. 2 does not limit this disclosure to any particular configuration of computing device or even to computing devices. Any other suitable device or system may require an authorized human response in order to prevent unintended or unauthorized peripheral device connectivity.

Figure 3:
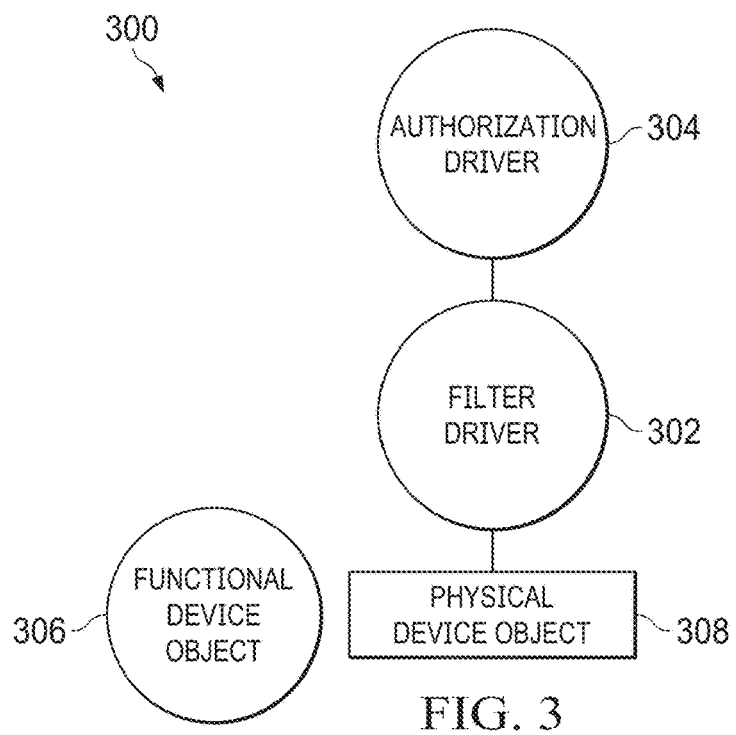
FIG. 3 illustrates an example functional architecture for preventing unintended or unauthorized peripheral device connectivity by requiring an authorized human response according to this disclosure.

FIG. 3 illustrates an example functional architecture 300 for preventing unintended or unauthorized peripheral device connectivity by requiring an authorized human response according to this disclosure. For ease of explanation, the functional architecture 300 of FIG. 3 may be described as being supported by or used in the device 200 of FIG. 2. However, the functional architecture 300 could be used in any other suitable device or system.

The functional architecture 300 generally operates using a software driver or a combination of software drivers to intercept device connection attempts from a device (such as the peripheral device 216), quarantine the device, and provide limited access to the device in order to authorize the device. Until the device is authorized through the receipt of an authorized human response, the device remains quarantined. Once the device is authorized, greater access to the device can be granted, although additional operations can still occur to monitor the device and detect unintended or unauthorized operations. In some embodiments, the functional architecture 300 could intercept device connection attempts at the lowest possible level in a host system, such as in the USB hub driver of a USB stack, in order to quarantine a device. This could prevent the host's operating system from performing anything meaningful using the device other than initially enumerating the device. Note, however, that other (but still limited) interactions could also occur involving the device and the host's operating system in order to authorize the device.

As shown in FIG. 3, the functional architecture 300 includes an authentication subsystem having a filter driver 302 and an authorization driver 304. These drivers 302 and 304 could be executed using the processor 202 of the device 200 or in any other suitable manner. The filter driver 302 is used to listen to a USB bus or other bus or connection for connection requests. When a device is detected, the filter driver 302 quarantines the device so that the device cannot interact with a host's operating system or can only interact in a limited manner with a host's operating system. This limits connectivity and use of the device while authentication occurs. The authorization driver 304 reports the device's connection attempt to a user, which can provide a human response that authenticates the device.

Once a device is authorized, at least part of the authorization functionally (such as one or both of the filter driver 302 and the authorization driver 304) could be removed from the operational path of the device. This provides the device with normal access to the host's operating system.

This can also help to reduce or prevent the authentication subsystem from interfering with or slowing the use of the authorized device.

In FIG. 3, a functional device object 306 can be created for a bus driver (such as a PCI, USB, or other bus driver) for a specific device being connected to a host system. A physical device object 308 can be created by the bus driver to represent the physical attachment of a newly-discovered device onto the bus. The device objects 306-308 could represent standard WINDOWS objects or other operating system objects. Here, the filter driver 302 can represent a device object that is used to obscure the newly-discovered device from the rest of the operating system until authorized. The authorization driver 304 allows the newly-discovered device to be used only for authorization or de-authorization operations, at least until authorization of the device occurs. After authorization of the device, the authorization driver 304 and optionally the filter driver 302 could possibly remove themselves from the operational path of the device, allowing the device to function normally.

In some embodiments, after a device has been detected and quarantined, the authorization driver 304 can present a visual notification (via the host's user interface) of the device type attempting to connect to the host, as well as a randomly-generated or other secret. The secret could denote a sequence of characters, a request for a biometric fingerprint, or any other information. The authorization driver 304 prompts the user to acknowledge and validate the connection by providing a response to the secret. The response could be provided in various ways, such as by typing the provided sequence on an attached input device (a keyboard), using a biometric fingerprint reader, or clicking using a mouse or other pointer. The user validates the device connection by providing some form of expected input, and the authorization driver 304 then informs the filter driver 302 that the device has been validated. The filter driver 302 allows the device to continue with normal device connectivity, such as via a standard USB stack, without the use of the authorization driver 304 for that device.

For devices that announce multiple device types, each device type could require validation before the device can fully connect. Also, the validation of any device type could allow only that specific device type to connect. For example, assume that a "combo" device includes a keyboard and an integrated trackpad. Such a device could first present itself as an HID device type for the keyboard, which would require validation before the keyboard could connect. The device could then present itself as an HID device type for the trackpad, which would require an additional validation before the trackpad could connect. The keyboard could be usable before the trackpad is authenticated, but the trackpad could not be used until the trackpad itself is authenticated. The reverse could also occur, where the trackpad is validated first and the keyboard is validated next (possibly where the trackpad is usable before the keyboard is authenticated). However, note that this need not be the case. In other embodiments, for example, all device types announced by or associated with a device could be identified and presented to a user, and some or all of the device types could be validated collectively by the user.

In some embodiments, validation or authentication of a device can optionally be coupled with user account authentication. For example, specific user account privileges may be needed before validation of a device can be accepted. In particular embodiments, user account authentication could be enforced per device type. For instance, normal users may be allowed to validate HID devices such as keyboards and mice, while only administrator accounts may be able to validate network adapters.

Also, in some embodiments, not all device connection requests may require a human response before a device is allowed to connect. For example, previously-connected devices (for which an authorized human response was previously obtained) and/or devices previously authorized by a suitable outside system may be placed into a "whitelist" of pre-authorized devices for which no additional authentication is needed. In these embodiments, new device connection attempts can be compared to the whitelist before an authorized human response is requested. If a device connection attempt is received from a device on the whitelist, access to the device could be granted without further user input. Otherwise, the device can be presented for authorization based on a specific and distinct action of a user (and possibly a particularly-authorized user or type of user). Note that it is also possible for groups or classes of devices to be previously-approved or pre-approved.

Further, in some embodiments, certain types of devices may optionally be pre-validated, such as by a suitable outside system. For example, any device containing a storage volume (such as a USB Flash drive) could be validated on one system (such as an SMX INTELLIGENCE GATEWAY from HONEYWELL INTERNATIONAL INC.) before being used on another system. The results of the validation could be added to an SMX manifest on the relevant storage volume. Upon insertion of an SMX checked-in storage device containing a valid manifest, SMX client software on an SMX-protected client computer could examine the manifest for any authorized devices (which could be identified by one, several, or all of the identifying parameters of the authorized devices) to determine if the current device has been pre-validated. If pre-validated, the SMX client software could instruct a driver (such as the authorization driver 304) to allow the pre-validated device to connect. Additional details regarding the SMX technology can be found in U.S. Patent Application Publication No. 2017/0351854 assigned to HONEYWELL INTERNATIONAL INC., which is hereby incorporated by reference in its entirety. Note that this functionality could be part of or separate from the use of whitelists. In other words, pre-validated devices may or may not be identified in a whitelist. In some cases, access could be granted to a peripheral device if the peripheral device is pre-validated, regardless of whether the device is currently on or added to a whitelist. In other cases, information identifying pre-validated devices could be added to a whitelist.

Note that while often described as being used with USB devices, the same or similar approaches described above could be used with other types of devices. For example, PCI cards, SD cards, and serially-connected devices could be quarantined until a required human authorization is obtained. Drivers for those devices could operate as described above to provide this protection.

As another example, the mechanisms described above could be used to quarantine and require human authorization for mechanical devices. A controlling host system could be a machine tool, such as a milling machine. Here, the initial discovery and enumeration of a device could occur during power-on of the host system, and the quarantine of the device could occur using a relay or group of relays with internal logic.

As still another example, the mechanisms described above could be used to quarantine and require human authorization for specific industrial control or automation components. Specific examples of control or automation components include digital or analog sensors, actuators, programmable logic controllers (PLCs), or other devices that communicate within an industrial control system (ICS) using one or more industrial messaging and communications protocols (such as OPC, MODBUS, PROFIBUS, HART, or FOUNDATION FIELDBUS). In these or other embodiments, communications could be quarantined using a network filter, rather than a bus filter.

The approaches here can be used to approve a quarantined device, based on a description of the device provided by the authorization system, after a specific and distinct action of an authorized user. For example, the specific and distinct action might include entering a predefined password or passcode on a computer screen, typing or clicking a passphrase displayed by the authorization system in a dialog box displayed by the authorization system, using a mouse to click on a series of software buttons on a screen, tapping on the screen in a specified sequence or series of locations, touching a sequence of targets on a touch screen in a particular order (each target identified by the authorization system), or setting a series of switches to requested positions. The specific and distinct action can be unique for each quarantined device that the user wishes to approve. Ideally, the user needs to perform a unique set of actions, described by the authorization system, to allow each device that has been quarantined to be used in the system. If the actions are not undertaken or are performed incorrectly, the device remains quarantined and is not made available for use by the system. Example descriptions of the devices that could be provided to the user may include one or more of the following: the name of the device, the name of the device manufacturer, a description of the device like a category or purpose of the device ("camera", "mouse", etc.), or the location of the newly-discovered device (such as "Hub 1, Port 3"). The information can be in a specific language or internationalized for the locale. The user can use the description to verify that the device is not presenting itself to the system in a manner that the user does not expect.

In some embodiments, the approaches described above can be used to quarantine a device as soon as the device is initially discovered or enumerated by a controlling system before the device is made usefully available to other parts of a host system. This restricts the device to examination and use only by an authorization system of the controlling system and any incidental enabling components of the host system. The controlling system could include a computer operating system, such as a MICROSOFT WINDOWS or other operating system. The initial discovery or enumeration of the device could occur during an initial computer system power-up ("boot"), the dynamic attachment of the device to the host system, the discovery of the device after returning the host system from a power saving operation, or at other times. The part of the system performing the initial discovery or enumeration of the device could be a bus driver or a controller driver within the operating system. The mechanism for enforcing the quarantine of the device could be a bus filter driver 302 or other filter that obscures the identity of the newly-discovered device and that causes another component (such as the authorization driver 304) to claim the device. Incidental enabling components may include the bus driver or the bus controller of the controlling system or a driver, a plug and play (PnP) manager, or a basic input/output system (BIOS) of the operating system. The component claiming the device could be a function driver (such as the authorization driver 304), which could be dedicated to this purpose and could have its own privately-defined interface that may only be used to authorize or de-authorize devices.

In other embodiments, the approaches described above can allow more (but still limited) interaction between a peripheral device and a host's operating system in order to collect additional information about the peripheral device. For example, various information could be obtained by the authentication subsystem from a peripheral device, such as its USB device interface class or classes, manufacturer name, and product name. However, without more, it may not be possible for the authentication subsystem to verify that the obtained information is correct since that information comes from the peripheral device itself. A rogue actor could modify a USB device to provide incorrect information in order to spoof a valid device. It is possible to collect additional information about the peripheral device once the device begins interacting with the host's operating system. For instance, when a peripheral device is connected to a host system running a WINDOWS operating system, the operating system typically selects at least one driver for the peripheral device. A selected driver could represent (i) a standard MICROSOFT-supplied driver for the device's device interface class or (ii) a more specific vendor-supplied driver (such as one provided by a system administrator, pre-loaded on a system, or downloaded). The WINDOWS operating system includes various algorithms used to decide which driver(s) will be used for a peripheral device, and the driver that is selected for a peripheral device can fully and completely determine how the device will be used in the host system. Thus, the authentication subsystem could allow limited interaction between a peripheral device and a host system so that the host's operating system can identify what driver or drivers will be used with the peripheral device. The authorization driver 304 could then use this information to inform a user about possible functions of the peripheral device, allowing the user to verify that these functions are authorized.

Even when it is known that an operating system will use a certain driver for a peripheral device, this is sometimes not enough to know all of the capabilities of the peripheral device in a host system. Whether additional details are needed to properly evaluate a peripheral device from a security perspective can depend, for example, on the peripheral device's device or interface class. Two common examples of when simply knowing which USB class driver for a device is being used is not enough to identify the potential uses (and threats) posed by the device are the USB HID device class and the USB mass storage device class. A huge number of devices and device-reported activities fall into the USB HID device class. One job of a USB HID device class driver is to examine HID-specific data (called report descriptors) available from a device and determine what additional drivers need to be used to support the device. Thus, the HID-specific data can ultimately determine the device's capabilities in the host system, and the authorization driver 304 could use this information to inform a user about possible functions of the HID device. Similarly, a USB mass storage device class driver can interrogate a device to determine the specific type of mass storage device being used, and this information defines the device's actual capabilities and could be used by the authorization driver 304.

Moreover, in some embodiments, the approaches here can be used to allow at least part of the authorization system to functionally remove itself from the operational path of a device once that device has been approved, thereby allowing the device to function normally and with no intermediation by the authorization system. For example, after receiving human authorization for a device, the authorization system could cause the host system to "re-discover" the device. This rediscovery could be done in various ways, such as by causing the port on the bus to reset. As part of the process of discovering the device after its approval, the authorization system does not quarantine the device and instead allows it to be claimed and used in the "normal" way. In some implementations, no authorization system component may remain intermediate between the device and the controlling system after the device has been approved, which allows the authorization system to have no impact on the performance or operation of approved devices. However, this need not be the case.

In addition, it may also be possible for system administrators or other personnel to define policies to assist in authorizing or denying peripheral devices. For example, a policy could be created that allows a single keyboard and a single mouse, trackpad, or other pointing device to be automatically authorized for use with a host system without requiring human authorization, while any additional HID devices require human authorization. As another example, policies could be created that define different processes for different types of devices, devices that use different drivers (such as standard drivers and vendor-specific drivers), and devices that have different numbers of device or interface classes. As yet another example, policies could be created that deal with authorizing devices that are and are not present on a host system when the system is initially booted. As still another example, policies could be created to define which users or user types can authorize certain devices or device types, to define what devices or device types can be authorized, or to define what devices or device types cannot be authorized. In general, any suitable policy or policies could be created and enforced to allow or deny peripheral device connectivity.

Although FIG. 3 illustrates one example of a functional architecture 300 for preventing unintended or unauthorized peripheral device connectivity by requiring an authorized human response, various changes may be made to FIG. 3. For example, various components in FIG. 3 could be combined, further subdivided, or omitted and additional components could be added according to particular needs. As a particular example, different operating systems could support the use of other or additional objects when managing the use of peripheral devices.

Figure 4A:
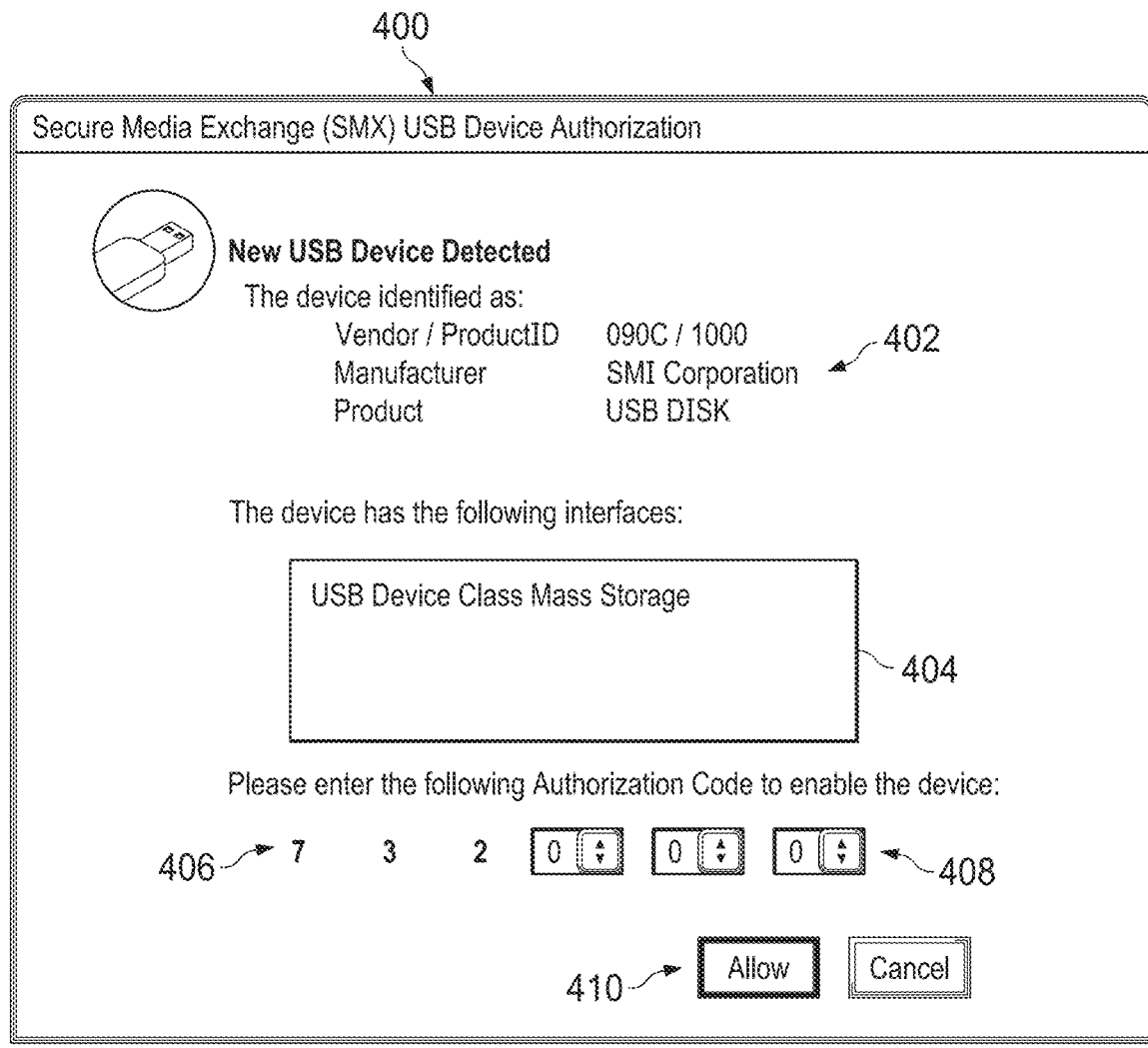
FIGS. 4A and 4B illustrate example graphical user interfaces for obtaining an authorized human response in order to prevent unintended or unauthorized peripheral device connectivity according to this disclosure.
Figure 4B:
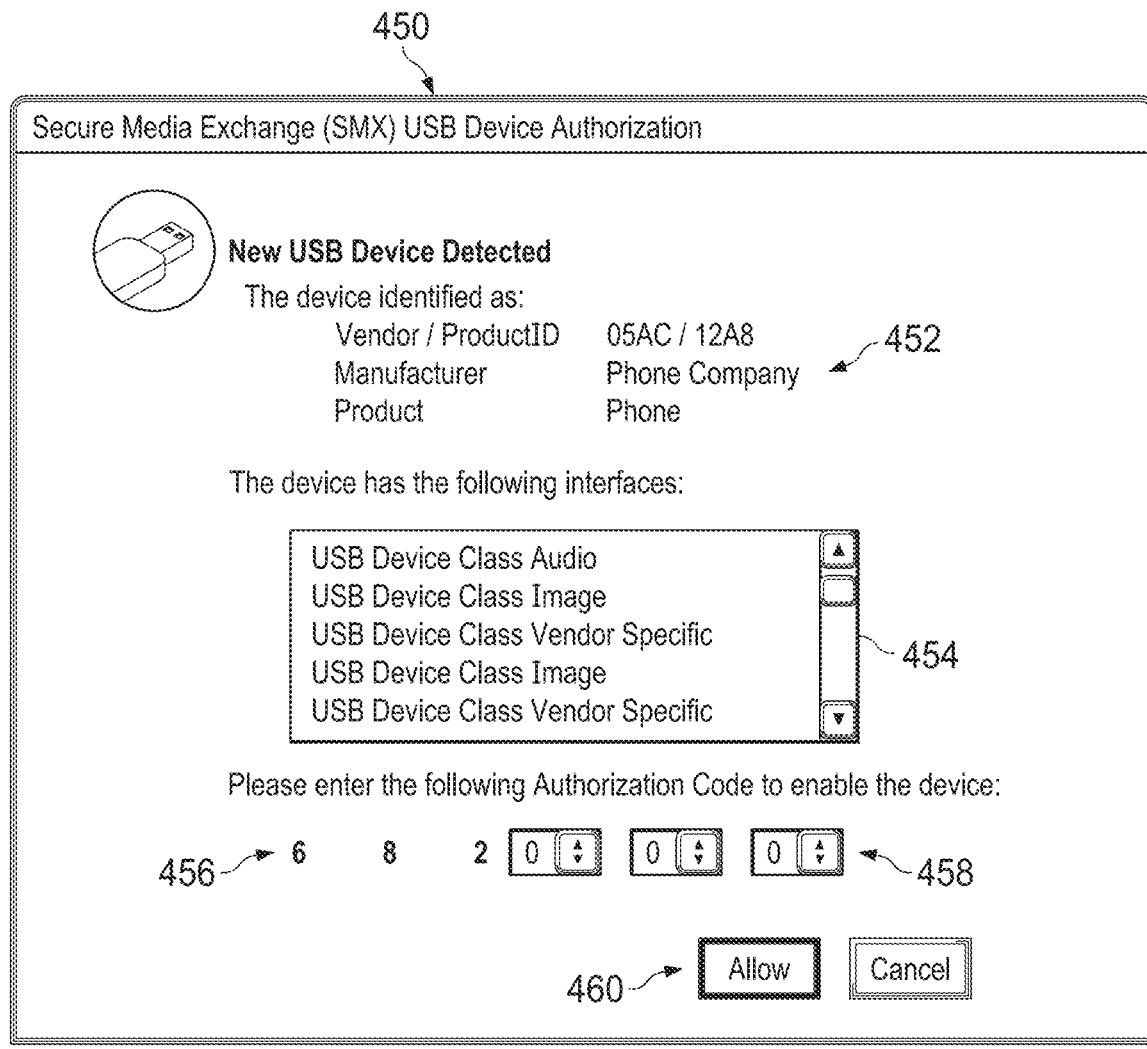

FIGS. 4A and 4B illustrate example graphical user interfaces 400 and 450 for obtaining an authorized human response in order to prevent unintended or unauthorized peripheral device connectivity according to this disclosure. Each of the graphical user interfaces 400 and 450 could be presented to a user when a host system detects a new device. In these examples, the devices are a USB storage device (FIG. 4A) and an APPLE IPHONE (FIG. 4B), although any other suitable devices could be identified.

As shown in FIG. 4A, the graphical user interface 400 includes information 402 identifying the peripheral device to be authorized. In this example, the information 402 includes a vendor identifier, a product identifier, a manufacturer, and a product type associated with the peripheral device. Of course, any other or additional information identifying or associated with the peripheral device could be displayed here. The graphical user interface 400 also includes a list 404 of device interface classes associated with the peripheral device, which relate to the types of functions that the peripheral device could perform after its use is authorized. In this example, there is a single interface class identified in the list 404.

As noted above, the information 402 and the interface class(es) in the list 404 could be obtained in various ways. In some embodiments, the information 402 and the interface class(es) in the list 404 could be based solely on information collected from the peripheral device, such as by the authorization driver 304. In other embodiments, the information 402 or the interface class(es) in the list 404 could be based at least partially on information from a host's operating system, such as an identification of the driver or drivers to be used with the peripheral device and the function(s) supported by the driver(s).

The graphical user interface 400 also includes a challenge 406 that requires a human response. In this example, the challenge 406 requests that a user provide a string of alphanumeric characters in drop-down menus 408 using an existing keyboard or mouse. For example, the user could use the mouse to select three numbers from the three drop-down menus 408, or the user could use the keyboard to jump between the drop-down menus 408 and select the three numbers in the drop-down menus 408. Other challenges could request that the user use an existing mouse to click on certain areas of a display screen, tap or touch in a specified sequence or series of locations, provide a biometric fingerprint, or perform any other suitable tasks. The challenge or challenges essentially require that a human operator provide some type of input in order to confirm that a device being connected to a host system is authorized by a person. The specific challenge or challenges could be identified in any suitable manner, such as by using a mapping or other data structure that associates specific types of challenges with specific types of devices. The specific challenge or challenges could also be random or selected in any other suitable manner. Buttons 410 can be used by the user to either indicate that the device should be authorized ("Allow") or quarantined further ("Cancel").

As shown in FIG. 4B, the graphical user interface 450 includes information 452 identifying the peripheral device to be authorized and a list 454 of device interface classes associated with the peripheral device. In this example, there are multiple interface classes identified in the list 454 since the peripheral device supports a large number of functions. The graphical user interface 450 also includes a challenge 456 and drop-down menus 458 similar to those elements described above, although other types of challenges and response inputs could be used. In addition, the graphical user interface 450 includes buttons 460 used to indicate that the device should be authorized or quarantined further.

In these examples, a user is able to view the information 402 or 452 about a peripheral device and verify that the information is correct. Among other things, this helps to reduce the likelihood of authorizing a peripheral device that is labeled as a certain device or device type but that is actually another device or device type. Moreover, the user is able to view the list 404 or 454 and verify that the class or classes associated with the peripheral device are correct. Among other things, this helps to reduce the likelihood of authorizing a peripheral device that is intended for one function and that is designed to perform another function.

If the authorization driver 304 is unable to collect certain information 402 or 452 from a device or if the authorization driver 304 is unable to identify any classes for inclusion in a list 404 or 454, this can be explicitly noted in the graphical user interface. While a user could still be allowed to authorize such a peripheral device, the user can be notified about the inability to retrieve the relevant information from the device (since this may or may not be indicative of a potential threat). In other embodiments, authorization of such a peripheral device may be blocked for some or all users due to the inability to retrieve the relevant information from the device.

Note that while the lists 404 and 454 in FIGS. 4A and 4B identify one or more interface classes, it is possible to provide other or additional information to a user. For example, one or more commonly-understandable category names could be provided instead of or in addition to the list of any interface classes. The category names could be based on the capabilities that the device will have on a host system to which the device has been attached. This can help to increase ease of use since some users may be unfamiliar with USB device class nomenclature. If a peripheral device will be serviced by a standard driver on a host system, the capabilities presented to the user could be based on that standard driver. If a peripheral device will be interfaced to a host system via a vendor-supplied driver, the user could be informed of this, and the list 404 could provide other information that helps to identify the device's role(s) or function(s). If a peripheral device has a very broad description (like USB HID or USB mass storage), the underlying capabilities of the device could be described, such as those capabilities that are identified based on the HID report descriptors or the type of mass storage device.

In some embodiments, a user could be required to log in or otherwise provide valid user credentials before authorizing a peripheral device, and a verification could be performed to confirm whether the user is allowed to authorize the peripheral device or the type of peripheral device. As noted above, for example, all users may be allowed to authorize HID devices, but only administrators may be allowed to authorize network adapters. Once a user logs in or otherwise validly identifies himself or herself, the user's identity or the user's account could be used to verify whether the user is allowed to authorize the peripheral device. If so, the graphical user interface 400 or 450 could be presented and used to receive an authorized human response from the user. If not, use of the peripheral device can be blocked, and the event could be logged to a security system or appropriate personnel could be notified.

Although FIGS. 4A and 4B illustrate examples of graphical user interfaces 400 and 450 for obtaining an authorized human response in order to prevent unintended or unauthorized peripheral device connectivity, various changes may be made to FIGS. 4A and 4B. For example, any other suitable mechanism could be used to present at least one challenge to a user and to receive at least one response from the user.

Figure 5:
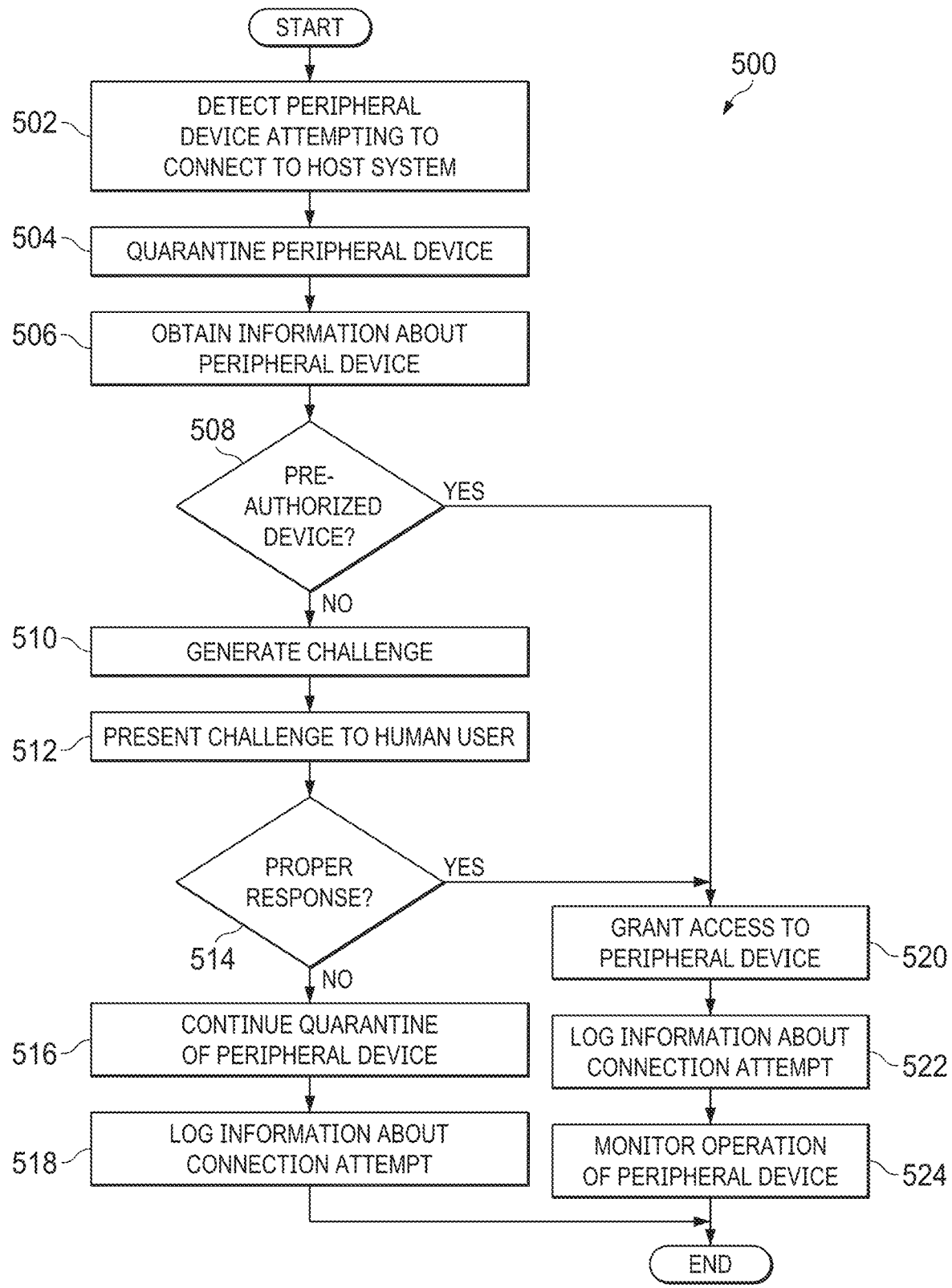
FIG. 5 illustrates an example method for preventing unintended or unauthorized peripheral device connectivity by requiring an authorized human response according to this disclosure.

FIG. 5 illustrates an example method 500 for preventing unintended or unauthorized peripheral device connectivity by requiring an authorized human response according to this disclosure. For ease of explanation, the method 500 is described as being performed using the device 200 of FIG. 2 supporting the functional architecture 300 of FIG. 3. However, the method 500 could be used with any other suitable device and in any suitable system.

As shown in FIG. 5, a peripheral device attempting to connect to a host system is identified at step 502. This could include, for example, the filter driver 302 detecting a connection request transmitted by a peripheral device 216 over a USB or other bus. The peripheral device could denote any suitable device attempting to connect to any suitable host system, including any of the peripheral devices and host systems described above. The peripheral device is quarantined at step 504. This could include, for example, the filter driver 302 limiting or preventing the peripheral device 216 from interacting with the host's operating system. In some embodiments, the host's operating system is only able to enumerate the peripheral device 216. In other embodiments, the filter driver 302 or authorization driver 304 could allow the host's operating system to interact with the peripheral device 216 in a limited manner. In particular embodiments, the filter driver 302 could allow the authorization driver 304 to claim the peripheral device 216, which helps to prevent the peripheral device 216 from having unrestricted interactions with the host system.

Information about the peripheral device is obtained at step 506. This could include, for example, the authorization driver 304 interacting with the peripheral device 216 to obtain information about the peripheral device 216, such as its name, device manufacturer, device description (like category or purpose), location, or device interface class(es). This could also include the authorization driver 304 allowing the host's operating system to interact with the peripheral device 216 to identify the driver or drivers that would be used with the peripheral device 216.

A decision is made whether the peripheral device is a pre-authorized device at step 508. This could include, for example, the authorization driver 304 determining whether the peripheral device 216 is listed in a whitelist of pre-authorized devices. In some embodiments, the authorization driver 304 could generate a device identifier specification for the peripheral device 216 and compare the device identifier specification to identifier specifications contained in the whitelist. This could also include the authorization driver 304 determining whether the peripheral device 216 has been validated by an SMX INTELLIGENCE GATEWAY or other trusted system, such as by examining any SMX manifest on the peripheral device 216. If the peripheral device is a pre-authorized device, the process skips to step 520.

Otherwise, a challenge is generated at step 510 and presented to a human user at step 512. This could include, for example, the authorization driver 304 generating a challenge and presenting the challenge to a user on a display screen. This could also include the authorization driver 304 receiving input from a keyboard, mouse, trackpad, biometric scanner, or other input device. This could further include the authorization driver 304 determining whether the received input represents a valid or expected response to the presented challenge.

If a determination is made at step 514 that no valid or expected response was received, the quarantine of the peripheral device is continued at step 516, and information about the failed connection attempt can be logged at step 518. This could include, for example, the filter driver 302 continuing to limit or prevent access to the peripheral device. This could also include the authorization driver 304 logging information about the attempt, such as information about the peripheral device, the user attempting to authorize the peripheral device, and the reason why the authorization failed.

If a determination is made at step 514 that a valid or expected response was received, access to the peripheral device is granted at step 520, and information about the successful connection attempt can be logged at step 522. This could include, for example, the authorization driver 304 informing the filter driver 302 that the host system is allowed to use the peripheral device. This could also include the authorization driver 304 and possibly the filter driver 302 removing themselves from the operational path of the peripheral device. This could further include the authorization driver 304 logging information about the attempt, such as information about the peripheral device and the user who authorized the peripheral device. Operation of the peripheral device with the host system can be monitored to detect unintended or unauthorized operation at step 524. This could include, for example, the authorization driver 304 or the processor 202 identifying whether the peripheral device 216 attempts to change its device type to a type not identified during the authorization process. If so, corrective action can be taken, such as deauthorizing the peripheral device 216.

Although FIG. 5 illustrates one example of a method 500 for preventing unintended or unauthorized peripheral device connectivity by requiring an authorized human response, various changes may be made to FIG. 5. For example, while shown as a series of steps, various steps in FIG. 5 could overlap, occur in parallel, occur in a different order, or occur any number of times.

Figure 6:
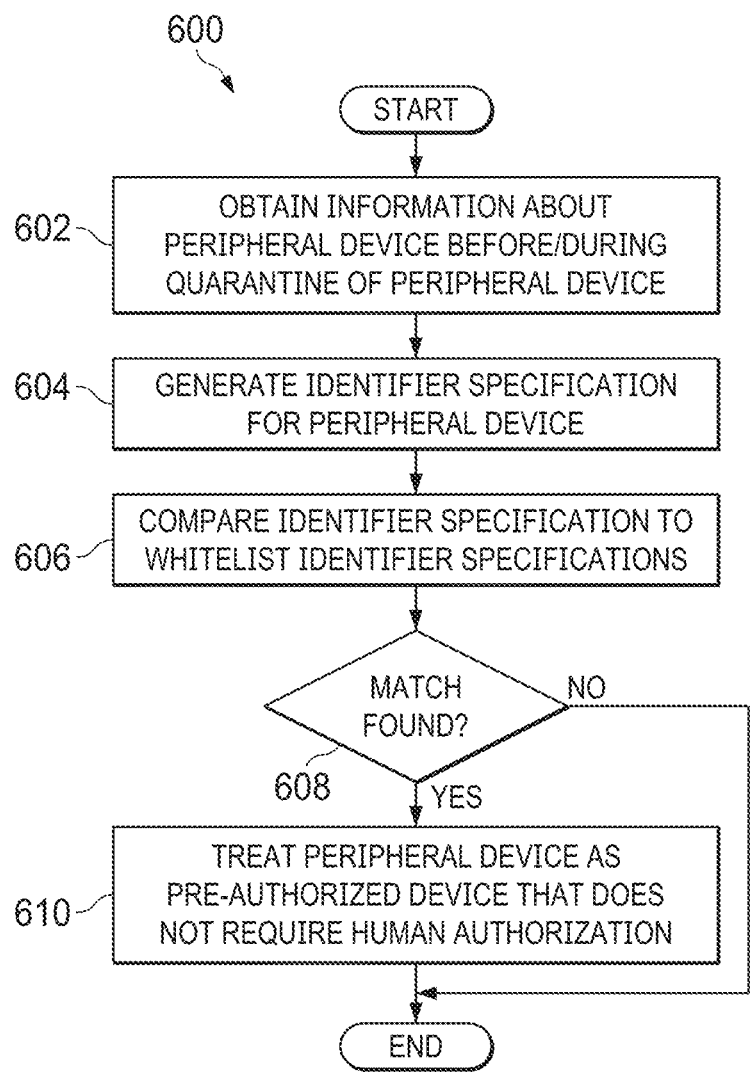
FIGS. 6 and 7 illustrate example methods supporting the use of whitelists to allow peripheral device connectivity without requiring an authorized human response according to this disclosure.
Figure 7:
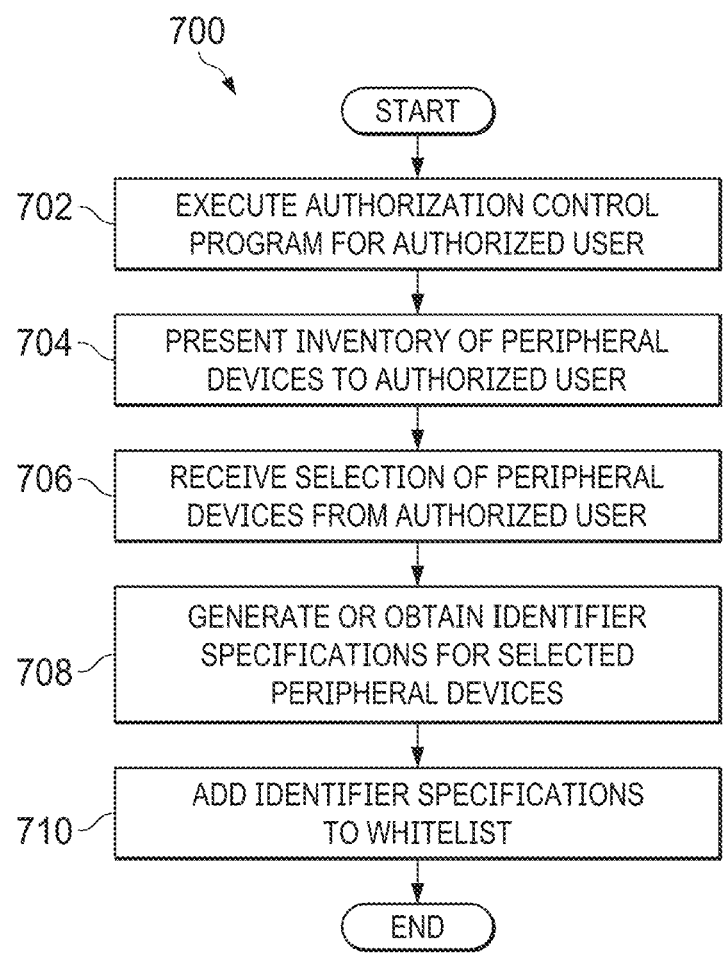

FIGS. 6 and 7 illustrate example methods 600 and 700 supporting the use of whitelists to allow peripheral device connectivity without requiring an authorized human response according to this disclosure. For ease of explanation, the method 600 is described as being performed using the device 200 of FIG. 2 supporting the functional architecture 300 of FIG. 3, and the method 700 is described as being performed using the device 200 of FIG. 2. However, the methods 600 and 700 could be used with any other suitable device and in any suitable system.

As shown in FIG. 6, the method 600 is used to generate a device identifier specification for a peripheral device, such as the peripheral device 216, where the device identifier specification is used to determine whether the peripheral device is identified in a whitelist. Information about the peripheral device is obtained before or during quarantine of the peripheral device at step 602. This could include, for example, the authorization driver 304 receiving information from the peripheral device 216 or from components coupled to or interacting with the peripheral device 216. In some embodiments, one or more of the following pieces of information could be obtained:

device manufacturer, device vendor, or alphanumerical identifier(s) describing the same;
device make, device model, or alphanumerical identifier(s) describing the same;
device type, device category, device class, or alphanumerical identifier(s) describing the same;
device serial number;
device revision;
device identifier number, such as one created by the authorization system to uniquely identify the device; and/or
logical or physical location of the device on the system.

A device identifier specification for the peripheral device is generated at step 604. This could include, for example, the authorization driver 304 creating a specific or unique device identifier specification that describes the peripheral device 216. The device identifier specification is created here using data that is available prior to and during the times that devices are quarantined. In some embodiments, the device identifier specification can include a device list that allows the device to be identified by the authorization system. For example, a device list may include:

PCI vendor identifier, device ID, and device revision of a device, along with a bus number and a bus slot into which the device is inserted on a host system;
USB vendor ID, product ID, and class of a device, along with the USB hub(s) and port(s) through which the device is connected to a host system;
USB class code of a device, optionally including the interface class, subclass, and protocols (to identify a category of the device); and/or
unique device ID associated with the device, such as one encoded in an EEPROM or switch settings, to identify a particular functional portion of a multi-function machine tool or other multi-function device.

The device identifier specification is compared to device identifier specifications in a whitelist at step 606. This could include, for example, the authorization driver 304 comparing the generated device identifier specification for the peripheral device 216 to the device identifier specifications in the whitelist. If a match in the whitelist is found at step 608, the peripheral device is treated as a pre-authorized device at step 610. In this case, the peripheral device does not require authentication via an authorized human action, and access to the peripheral device can be granted automatically as shown in FIG. 5. Otherwise, a determination can be made that the peripheral device does require authentication via an authorized human action.

Each device identifier specification can be unique due to the particular collection and association of information. The information could be made available from a device to the authorization system before the device is quarantined and/or after the device has been quarantined. Each device identifier specification could uniquely identify both a device and its location in a system, thus allowing the authorization system to differentiate between otherwise identical devices attached via different mechanisms to the same system (such as different keyboards plugged into different USB ports).

The approaches here can be used to examine each device as it is discovered and before/after the device is quarantined. Device information from or about the device can be compared to one or more device identifier specifications collected in a whitelist. If the newly-discovered device is among the previously-determined devices in the whitelist, the newly-discovered device can be automatically approved for use. If not, the device can remain in quarantine until approved based on a human authorization. For example, as the host system starts or at other times, the authorization system can gather information from each device, one at a time, as each device is discovered. The device identifier specification for each device is formed and compared to those specifications in a whitelist. If the newly-discovered device is in the whitelist, it can connect without any further human action to authorize the device. The device is allowed to connect "normally" to the controlling system with no further interference by the authorization system. Otherwise, the device remains in quarantine until approved.

As shown in FIG. 7, the method 700 is used to select which peripheral devices are pre-approved so that they are identified in a whitelist. An authorization control program is executed for an authorized user at step 702. This could include, for example, the processor 202 executing the control program for a system administrator or other user with sufficient privileges. An inventory of peripheral devices is presented to the authorized user at step 704. This could include, for example, the processor 202 executing the control program to identify all peripheral devices that are currently connected to at least one host system or that have been connected to at least one host system. This could also include the processor 202 executing the control program to display a list of the identified peripheral devices. A selection of one or more of the peripheral devices is received from the authorized user at step 706. This could include, for example, the processor 202 executing the control program to receive a selection of which peripheral devices in the list are to be added to the whitelist.

A device identifier specification is generated or obtained for each selected peripheral device at step 708. This could include, for example, the processor 202 executing the control program to generate the device identifier specifications as described above or to obtain device identifier specifications that were previously generated. The previously-generated device identifier specifications could represent those device identifier specifications that were generated as shown in FIG. 6. The device identifier specification for each selected peripheral device is added to the whitelist at step 710. This could include, for example, the processor 202 executing the control program to store at least some of the contents of the device identifier specifications in a data structure associated with the whitelist.

The approaches here can be used by the authorization system to create, collect, and store a series of device identifier specifications into a whitelist, such as at the request of a user particularly authorized to do so. Devices described in such a series of device identifier specifications can be automatically authorized by the authorization system. For example, the process of collecting the devices on the whitelist could take place as a result of a specifically-authorized operator running a program that has been provided as part of the authorization system. The program could inventory all of the devices on a WINDOWS system or other host system and present the list of devices to the authorized operator. The operator could then choose which devices to "bless," and the authorization system could create a device identifier specification for each of those devices and store the list in a secure location (such as the WINDOWS registry). It is also possible for an authorized user to pre-approve groups or classes of devices, rather than pre-approving individual devices.

Although FIGS. 6 and 7 illustrate examples of methods 600 and 700 supporting the use of whitelists to allow peripheral device connectivity without requiring an authorized human response, various changes may be made to FIGS. 6 and 7. For example, while the use of device identifier specifications is described here, any other suitable mechanisms can be used to identify devices that are pre-approved (assuming such functionality is supported). Also, while shown as a series of steps, various steps in each figure could overlap, occur in parallel, occur in a different order, or occur any number of times.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
  detecting a connection attempt of an industrial control or automation component to an industrial control system over a network, wherein the industrial control or automation component is configured to communicate with the industrial control system using one or more industrial messaging and communications protocols over the network, wherein the one or more industrial messaging and communications protocols comprises one or more of OPC, MODBUS, PRO-FIBUS, HART, and FIELD-BUS;
  in response to detecting the connection attempt, automatically quarantining at least some communications of the industrial control or automation component over the network using a network filter rather than or in addition to a bus filter driver to prevent the industrial control or automation component from fully communicating with the industrial control system over the network;
  with the at least some communications of the industrial control or automation component quarantined, determining whether the industrial control or automation component requires verification; and in response to determining that the industrial control or automation component requires verification:
- presenting at least one authorization challenge to a user with the at least some communications of the industrial control or automation component quarantined, the at least one authorization challenge requesting that the user provide at least one specified response;
- determining whether the user correctly provided the at least one specified response with the at least some communications of the industrial control or automation component quarantined;
- releasing the quarantine on the at least some communications of the industrial control or automation component in response to determining that the user correctly provided the at least one specified response; and
- continuing to quarantine the at least some communications of the industrial control or automation component in response to determining that the user did not correctly provide the at least one specified response.

2. The method of claim 1, further comprising:
claiming the industrial control or automation component using an authentication subsystem while the at least some communications of the industrial control or automation component are quarantined;
wherein the authentication subsystem is configured to initiate presentation of the at least one authorization challenge and to determine whether the user correctly provided the at least one specified response.

3. The method of claim 2, further comprising:
removing at least part of the authentication subsystem from a communication path of the industrial control or automation component after the quarantine on the at least some communications of the industrial control or automation component is released.

4. The method of claim 1, further comprising:
in response to determining that the industrial control or automation component requires verification, displaying information about the industrial control or automation component to a user while the at least some communications of the industrial control or automation component are quarantined.

5. The method of claim 1, further comprising:
generating an identification specification for the industrial control or automation component using data received from the industrial control or automation component over the network before or during the quarantining of the at least some communications of the industrial control or automation component.

6. The method of claim 5, wherein:
determining whether the industrial control or automation component requires verification comprises comparing the identification specification to previously-approved or pre-approved identification specifications, the previously-approved or pre-approved identification specifications associated with previously-approved or pre-approved industrial control or automation components or groups or classes of industrial control or automation component; and
determining that the industrial control or automation component requires verification in response to determining that the identification specification does not match any of the previously-approved or pre-approved identification specifications.

7. The method of claim 1, wherein:
quarantining the at least some communications of the industrial control or automation component comprises allowing the industrial control or automation component to interact with the industrial control system over the network in order to identify one or more drivers to be used with the industrial control or automation component; and
the method further comprises displaying information about the industrial control or automation component to a user while the at least some communications of the industrial control or automation component are quarantined, wherein at least part of the information is based at least in part on the one or more identified drivers.

8. An apparatus comprising at least one processor and at least one memory storing instructions that when executed by the at least one processor causes the at least one processor to:
- detect a connection attempt from an industrial control or automation component with an industrial control system over a network;
- automatically quarantine at least some communications of the industrial control or automation component using a network filter rather than or in addition to a bus filter driver in response to detecting the connection attempt to prevent the industrial control or automation component from fully communicating with the industrial control system over the network;
- while the at least some communications of the industrial control or automation component are quarantined, determine whether the industrial control or automation component requires verification; and
- in response to determining that the industrial control or automation component requires verification:
  - present at least one authorization challenge to a user while the at least some communications of the industrial control or automation component are quarantined, the at least one authorization challenge including a displayed authorization code and a request that the user enter the displayed authorization code;
  - determine whether the user correctly entered the displayed authorization code while the at least some communications of the industrial control or automation component is quarantined;
  - releasing the quarantine on the at least some communications of the industrial control or automation component in response to determining that the user correctly entered the displayed authorization code; and
  - continue to quarantine the at least some communications of the industrial control or automation component in response to determining that the user did not correctly enter the displayed authorization code.

9. The apparatus of claim 8, wherein the at least one processor is further configured to:
- execute an authentication subsystem configured to quarantine the at least some communications of the industrial control or automation component; and
- claim the industrial control or automation component using the authentication subsystem while the at least some communications of the industrial control or automation component are quarantined; and
- wherein the authentication subsystem is configured to initiate presentation of the at least one authorization challenge and to determine whether the user correctly provided the displayed authorization code.

10. The apparatus of claim 9, wherein the at least one processor is further configured to remove at least part of the authentication subsystem from a communication path of the industrial control or automation component after the quarantine on the at least some communications of the industrial control or automation component is released.

11. The apparatus of claim 8, wherein the at least one processor is further configured, in response to determining that the industrial control or automation component requires verification, to display information about the industrial control or automation component to a user while the at least some communications of the industrial control or automation component are quarantined.

12. The apparatus of claim 8, wherein the at least one processor is further configured to generate an identification specification for the industrial control or automation component using data received from the industrial control or automation component before or during the quarantining of the at least some communications of the industrial control or automation component.

13. The apparatus of claim 12, wherein, to determine whether the industrial control or automation component requires verification, the at least one processor is configured to:
compare the identification specification to previously-approved or pre-approved identification specifications, the previously-approved or pre-approved identification specifications associated with previously-approved or pre-approved industrial control or automation components or groups or classes of industrial control or automation components; and
determine that the industrial control or automation component requires verification in response to determining that the identification specification does not match any of the previously-approved or pre-approved identification specifications.

14. The apparatus of claim 8, wherein:
the at least one processor is configured to allow the industrial control or automation component to interact with the industrial control system in order to identify one or more drivers to be used with the industrial control or automation component; and
the at least one processor is further configured to display information about the industrial control or automation component to a user while the at least some communications of the industrial control or automation component are quarantined, at least part of the information based at least in part on the one or more identified drivers.

15. A non-transitory computer readable medium containing instructions that when executed cause at least one processing device to:
detect a network connection attempt of an industrial control or automation component on an industrial network that uses one or more industrial messaging and communications protocols, wherein the one or more industrial messaging and communications protocols comprises one or more of OPC, MODBUS, PROFIBUS, HART, and FIELDBUS;
automatically quarantine the industrial control or automation component using a network filter in response to detecting the connection attempt to prevent the industrial control or automation component from fully communicating with an industrial control system over the industrial network;
while the industrial control or automation component is quarantined, determine whether the industrial control or automation component requires verification; and
in response to determining that the industrial control or automation component requires verification:
present at least one authorization challenge to a user while the industrial control or automation component is quarantined, the at least one authorization challenge requesting that the user provide at least one specified response;
determine whether the user correctly provided the at least one specified response while the industrial control or automation component is quarantined;
release the quarantine on the industrial control or automation component in response to determining that the user correctly provided the at least one specified response; and
continue to quarantine the industrial control or automation component in response to determining that the user did not correctly provide the at least one specified response.

16. The non-transitory computer readable medium of claim 15, further containing instructions that when executed cause the at least one processing device to:
execute an authentication subsystem configured to quarantine the industrial control or automation component; and
claim the industrial control or automation component using the authentication subsystem while the industrial control or automation component is quarantined; and
wherein the authentication subsystem is configured to initiate presentation of the at least one authorization challenge and to determine whether the user correctly provided the at least one specified response.

17. The non-transitory computer readable medium of claim 16, further containing instructions that when executed cause the at least one processing device to remove at least part of the authentication subsystem from a communication path of the industrial control or automation component after the quarantine on the industrial control or automation component is released.

18. The non-transitory computer readable medium of claim 15, further containing instructions that when executed cause the at least one processing device, in response to determining that the industrial control or automation component requires verification, to display information about the industrial control or automation component to a user while the industrial control or automation component is quarantined.

19. The non-transitory computer readable medium of claim 15, further containing instructions that when executed cause the at least one processing device to generate an device identification specification for the industrial control or automation component using data received from the industrial control or automation component before or during the quarantining of the industrial control or automation component.

20. The non-transitory computer readable medium of claim 15, further containing instructions that when executed cause the at least one processing device to:
allow the industrial control or automation component to interact with the industrial control system in order to identify one or more drivers to be used with the industrial control or automation component; and
display information about the industrial control or automation component to a user while the industrial control or automation component is quarantined, wherein at least part of the information is based at least in part on
the one or more identified drivers.

\* \* \* \* \*